United States Patent [19]
Khouri et al.

[11] Patent Number: 5,393,833
[45] Date of Patent: Feb. 28, 1995

[54] THERMOPLASTIC OLEFIN COPOLYMERS AND BLENDS PREPARED THEREFROM

[75] Inventors: Farid F. Khouri, Clifton Park; Gregory J. Stoddard, Slingerlands, both of N.Y.

[73] Assignee: General Electric Company, Schenectady, N.Y.

[21] Appl. No.: 160,133

[22] Filed: Dec. 2, 1993

[51] Int. Cl.$^6$ .................. C08L 71/12; C08L 23/26
[52] U.S. Cl. ........................ 525/64; 525/68; 525/69
[58] Field of Search ............... 525/64, 68, 69

[56] References Cited

U.S. PATENT DOCUMENTS

| | | | |
|---|---|---|---|
| 4,731,418 | 3/1988 | Dean | 525/205 |
| 4,864,002 | 9/1989 | Schuetz et al. | 525/204 |
| 4,996,263 | 2/1991 | Pyke et al. | 525/178 |
| 5,124,410 | 6/1992 | Campbell | 525/293 |
| 5,132,361 | 7/1992 | Shea et al. | 525/66 |
| 5,142,049 | 8/1992 | Khouri et al. | 544/218 |
| 5,153,290 | 10/1992 | Khouri et al. | 526/266 |
| 5,171,866 | 12/1992 | Khouri | 548/449 |
| 5,177,146 | 1/1993 | Scobbo, Jr. et al. | 525/74 |
| 5,212,255 | 5/1983 | Khouri et al. | 525/391 |

OTHER PUBLICATIONS

C. T. Meyer et al., Polymer Letters, 1978, vol. 19, Sep., "Preparation of Polydiene-g-Polystyrene Graft Copolymers", pp. 1106–1109.

Fowler et al., Polymer Engineering and Science, Mid-Mov. 1988, vol. 28, No. 21, "Rubber Toughening of Polystyrene Through Reactive Blending", pp. 1427–1433.

*Primary Examiner*—James J. Seidleck
*Assistant Examiner*—Thomas Hamilton, III
*Attorney, Agent, or Firm*—Edward A. Squillante, Jr.; William H. Pittman

[57] ABSTRACT

Novel thermoplastic olefin copolymers and blends comprising the same are prepared from precursor functionalized olefin polymers and functionalized addition polymers. Additionally, the thermoplastic olefin copolymers comprise ester linkages and sulfide linkages.

6 Claims, No Drawings

THERMOPLASTIC OLEFIN COPOLYMERS AND BLENDS PREPARED THEREFROM

FIELD OF THE INVENTION

This invention relates to novel thermoplastic olefin copolymers and blends comprising the same. Particularly, said thermoplastic olefin copolymers are prepared from precursor functionalized olefin polymers and functionalized addition polymers under reactive conditions.

BACKGROUND OF THE INVENTION

Plastics are conventionally divided into two distinct and important groups: thermoplastics and thermosetting materials. Thermoplastics are those which melt to become viscous liquids when heated and solids when cooled. They are characterized by their flexibility as well as their ability to be repeatedly softened and hardened. Examples of common thermoplastics include acrylic, nylon, polyesters, polyvinyl chloride and polystyrene. Conversely, thermosetting materials are those which can only be heated and shaped once and, thus, they are not reworkable. Further, thermosetting materials are often hard, rigid, insoluble and infusable. Illustrative examples of such materials include phenolics, epoxies and unsaturated polyesters.

It is of increasing interest to prepare thermoplastics that are toughened since they are often employed in many commercial applications. Commercial methods for toughening thermoplastics usually involve blending into the plastic an elastomer having a low glass transition temperature. Often, however, the immiscibility and incompatibility of the elastomer with the thermoplastic produce poor physical properties in the blend. A compatibilization strategy is then required to improve physical properties. Said strategy typically involves incorporating copolymers prepared from the thermoplastic and the elastomer in the blend. The copolymer serves to improve rubber phase dispersion and adhesion, and thereby improves compatibility and physical properties of the blend.

Accordingly, the first embodiment of the instant invention is directed to novel thermoplastic olefin copolymers. Said copolymers are prepared from reactions of ortho compound functionalized olefin polymers and acid, acid anhydride or thiol functionalized addition polymers. Additionally, the second embodiment of the instant invention pertains to blends comprising the above-described copolymers. In the instant invention, ortho compound is defined as orthoesters and orthocarbonates.

DESCRIPTION OF THE PRIOR ART

Graft copolymers derived from addition polymers and elastomers have traditionally been prepared by polymerizing an olefinic monomer in the presence of a rubber substrate and a free radical initiator. The graft reaction can be achieved in emulsion, suspension, solution or bulk processes. While such processes are widely used, they are not desirable since they disadvantageously require handling and disposing of monomers, solvent and reaction by-products.

Other investigators have focused on the preparation of addition polymer-rubber copolymers by melt processing amine functionalized addition polymers with functionalized elastomers since amines are known to react with a variety of electrophilic moieties including anhydrides, epoxides and alkyl halides. However, this method is not favored since amine-functionalized addition polymers are not available in bulk quantities for copolymer formation.

Finally, in commonly assigned U.S. patent application Ser. No. 08/077,262, now U.S. Pat. No. 5,310,795 addition polymer-rubber copolymers that comprise carbamate functionalized addition polymers are disclosed.

The instant invention is patentably distinguishable from the above-described since, among other reasons, it is directed to novel thermoplastic olefin copolymers that are prepared by melt or solution reactions of ortho compound functionalized olefin polymers and acid, acid anhydride or thiol functionalized addition polymers, wherein said thermoplastic olefin copolymers comprise ester or sulfide olefin polymer to addition polymer linkages. Further, novel blends comprising the above-described copolymers are disclosed herein, wherein said blends unexpectedly display superior notched Izod and tensile elongation values.

SUMMARY OF THE INVENTION

In a first aspect, the instant invention pertains to novel thermoplastic olefin copolymers comprising ester or sulfide linkages. Said novel thermoplastic olefin copolymers are prepared by the reaction of ortho compound functionalized olefin polymers comprising structural unit of the formula

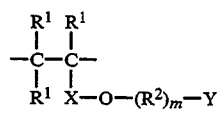

and an additional polymer having acid, acid anhydride or thiol functionality. Illustrative examples of the functionalized additional polymers include polyphenylene ether, polyphenylene sulfide and functionalized polymers of vinyl monomers such as polystyrene and acrylics.

Each $R^1$ is independently a hydrogen, lower alkyl ($C_1$-$C_5$ hydrocarbon), substituted or unsubstituted aromatic radical or a halogen and $R^2$ is —$CH_2$— or a substituted or unsubstituted divalent aromatic radical and m is greater than or equal to 1.

X is a substantially inert linking group and preferably is represented by groups of the formulae

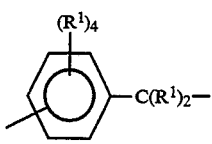

—C($R^1$)$_2$—.     IV

Y is selected from the group consisting of cyclic moieties of orthocarbonates and cyclic orthoesters having the formula

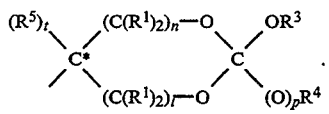

$R^3$ is a $C_1$–$C_{10}$ primary or secondary alkyl or aralkyl or a $C_6$–$C_{10}$ aromatic radical or an alkylene radical forming a second 4 to 8 membered ring with C* thus producing a bicyclo compound. $R^4$ is a $C_1$–$C_{10}$ primary or secondary alkyl or aralkyl or a $C_6$–$C_{10}$ aromatic radical. Further, $R^3$ and $R^4$ together with atoms connecting them can form a 4 to 8 membered ring thus producing a spirobicyclo compound. $R^5$ is a hydrogen, alkyl or aryl. l is 0 or 1 and n is an integer from 0 to 2. p is 0 or 1 and t is 0 when $R^3$ and C* form a bicyclo compound and is otherwise 1.

A second aspect of the instant invention is directed to novel blends comprising the above-described thermoplastic olefin copolymers. Suitable polymers for generating the instant blends include, for example, polyphenylene ether, polyphenylene sulfide, polystyrene and acrylics.

DETAILED DESCRIPTION OF THE PREFERRED EMBODIMENTS

Preparation of the functionalization monomers (ethylenically unsaturated cyclic ortho compounds) employed in the invention is achieved by reactions between hydroxy-substituted orthoester and $\alpha,\beta$-unsaturated acid chlorides to form acrylate type esters. The preparation is further illustrated by the following examples. Molecular structures of all products in Examples 1–3 were confirmed by proton and carbon-13 nuclear magnetic resonance spectroscopy.

EXAMPLE 1

A 5-liter 3-necked flask fitted with a mechanical stirrer, pressure equalizing addition funnel and nitrogen inlet was charged with 301 grams (2.03 moles) of 4-hydroxymethyl-2-methoxy-2-methyl-1,3-dioxolane, 514 grams (5.08 moles) of triethylamine and 2 liters of methylene chloride. The flask was immersed in an ice-water bath and 193.1 grams (2.13 moles) of acryloyl chloride was added over 50 minutes under nitrogen, with stirring. The mixture was stirred at room temperature overnight and the filtrate was washed twice with 2-liter portions of water, dried over magnesium sulfate, filtered and vacuum stripped. A free radical inhibitor, 3-t-butyl-4-hydroxy-5-methylphenyl sulfide, was added in the amount of 200 ppm. to the residue which was then distilled under vacuum. The desired 4-acryloyloxymethyl-2-methoxy-2-methyl-1,3-dioxolane distilled at 80°–85° C./0.5–1.0 torr.

EXAMPLE 2

The procedure of Example 1 was repeated, employing 281 grams (1.9 moles) of 4-hydroxymethyl-2-methoxy-2-methyl-1,3-dioxolane, 481 grams (4.76 moles) of triethylamine and 199 grams (1.9 moles) of methacryloyl chloride. The product, 4-methacryloyloxymethyl-2-methoxy-2-methyl-1,3-dioxolane, was collected at 80° C./0.4 torr.

EXAMPLE 3

The procedure of Example 1 was repeated, employing 21 grams (100 mmol.) of 4-hydroxymethyl-2-methoxy-2-phenyl-1,3-dioxolane, 25.3 grams (250 mmol.) of triethylamine, 9.5 grams (105 mmol.) of acryloyl chloride and 150 ml. of methylene chloride. The crude product was purified by column chromatography over basic alumina, using 15% (by volume) ethyl acetate in hexane as an eluent, to yield the desired 4-acryloyloxymethyl-2-methoxy-2-phenyl-1,3-dioxolane.

Further, the functionalized olefin polymers employed in the instant invention may be prepared via extrusion of a large variety of polymerizable compounds. The extrusion techniques as well as the polymerizable compounds include those described in commonly assigned U.S. Pat. No. 5,153,290, the disclosure of which is incorporated herein by reference.

The additional polymers employed in this invention comprising acid or acid anhydride functionality are prepared by standard free radical polymerization techniques known to those skilled in the art. The functionalized vinyl monomer (such as functionalized styrenes and acrylics), and optionally one or more conventional vinyl monomers are polymerized via bulk, suspension, emulsion or solution polymerization methods in the presence of a free radical initiator, such as azobisisobutyronitrile (AIBN) or benzoyl peroxide. Broadly, the functionalized vinyl monomer may comprise from about 0.1 to 100 mole percent of the total monomer feedstream; however, the operable concentration may depend upon the specific functionalized monomer. The additional polymers comprising thiol functionality are typically prepared by polymerization of vinyl mercaptan precursors as well as by the methods described in Adv. Polym. Sci., Vol. 15, 1974, pp. 61–90.

Further, the concentration of free radical initiator generally ranges from about 0.001 to about 1.0 weight percent based on total weight of monomers. A variety of organic solvents is suitable for the solution polymerization method and halohydrocarbons, such as methylene chloride; ketones such as methyl ethyl ketone and acetone; and aromatic hydrocarbons, such as toluene and ethylbenzene, are often preferred. The temperature of the free radical polymerization generally ranges from 40° C. to about 150° C. The resulting polymers of this invention possess a weight average molecular weight (as determined by gel permeation chromatography) typically ranging from about 40,000 to about 250,000.

The functionalized additional polymers of this invention are capable of reacting with the above-described functionalized olefin polymers to form thermoplastic functionalized olefin copolymers. The olefin polymers that are functionalized in accordance with the instant invention and suitable for forming such copolymers include elastomers that possess a glass transition temperature, Tg, less than about 0° C. and preferably less than about −20° C. Illustrative examples of suitable polyolefins include ethylene propylene diene comonomer (EPDM) rubbers, ethylene alkene rubbers such as poly(ethylene-co-propylene), polydiene rubbers such as poly(butadiene), and polyacrylates such as poly(butylacrylate).

In a preferred example, a functionalized additional polymer in accordance with the instant invention designated styrene acrylonitrile-A (SAN-A), prepared by the copolymerization of styrene, acrylonitrile and an acid, acid anhydride or masked thiol functionalized vinyl monomer, is melt extruded with an EPDM rubber functionalized with a cyclic orthoester or carbonate as depicted by formula I to afford a novel EPDM-SAN copolymer. A typical example includes reacting SAN-A with an EPDM rubber functionalized with cyclic 2-methoxy-2-methyl-1,3 dioxolane to form a novel EPDM-SAN copolymer.

The reactions between functionalized additional polymer and the functionalized olefin polymers is conventionally conducted in the melt or in solution. The process of preparing the thermoplastic olefin copolymers of this invention, for instance by the melt, comprises mixing polyolefin functionalized with cyclic orthoesters or orthocarbonates with the acid, acid anhydride or thiol functionalized additional polymer employed in this invention and melt reacting the mixture at a temperature ranging from about 170° C. to about 350° C. Preferably, the temperature ranges from about 200° C. to about 260° C. Typical melt processing techniques include continuous extrusion through a single screw or twin screw extrusion device, such as a Welding Engineers 20-mm. twin screw extruder, and melt reaction in a Helicone reactor or Brabender melt mixer. One skilled in the art will recognize that if extrusion is employed, the screw design, screw speed, and feed rate may vary.

The copolymer containing blends of the instant invention typically range from about 20 to about 90 weight percent, preferably from about 40 to about 80 weight percent, functionalized olefin polymer, and typically from about 80 to about 10 weight percent, preferably from about 60 to about 20 weight percent, functionalized additional polymer. Optionally, an unfunctionalized addition polymer such as SAN, may be added to the additional polymer and functionalized olefin. The concentration of unfunctionalized addition polymer typically comprises from about 0 to about 50 weight percent, preferably from about 0 to about 25 weight percent, based on the weight of the functionalized additional polymer. More preferably, no unfunctionalized addition polymer is employed.

The thermoplastic olefin copolymers of this invention are useful as compatibilizers and impact modifiers for thermoplastic polymers, such as SAN. As is well known in the art, melt processing is typically employed to blend polymers. For example, the thermoplastic olefin copolymer of this invention may be dry mixed with a thermoplastic polymer, and the resulting mixture may be extruded at a temperature in the range from about 170° C. to about 290° C. to form the plastic blend. Typically, the concentration of thermoplastic olefin copolymer in the blend ranges from about 5 to about 70 weight percent, preferably from about 10 to about 50 weight percent.

The addition of EPDM-SAN copolymers of this invention into blends of SAN results in poly(acrylonitrile-EPDM-styrene) (AES) blends having unexpected and improved physical properties when compared with corresponding simple blends. For example, the thermoplastic olefin copolymer of this invention may be dry mixed with a thermoplastic polymer, and the resulting mixture may be extruded at a temperature in the range from about 170° C. to about 290° C. to form the plastic blend. Typically, the concentration of the thermoplastic olefin copolymer in the blend ranges from about 5 to about 70 weight percent, preferably from about 10 to about 50 weight percent.

Tensile bars can be molded from the AES blend described above on an injection molding machine at about 225° C., and the bars can be tested on an Instron Universal tester. The unexpected and improved properties include increased notched Izod impact strength, increased maximum elongation, and decreased EPDM particle size. Those skilled in the art will recognize how to test for these properties. The maximum elongation of these blends is usually at least about 10 percent, preferably at least about 15 percent and more preferably at least about 25 percent, as measured by ASTM D638, incorporated herein by reference. AES blends comprising SAN, EPDM and the EPDM-SAN of this invention exhibit notched Izod impact strengths of typically at least about 90 joules/M., preferably at least about 130 joules/M., and more preferably about 335 joules/M., as measured by the American Standard Testing Method (ASTM) D256, also incorporated herein by reference. EPDM particle size is reduced when the EPDM-SAN copolymer of this invention is employed in an AES blend, as measured by examination of the sample under a scanning electron microscope.

The following additional examples are to further illustrate and facilitate the understanding of the invention. All products obtained may be confirmed by conventional techniques such as proton and carbon 13 nuclear magnetic resonance spectroscopy as well as infrared spectroscopy.

EXAMPLE 4

The synthesis of a styrene acrylonitrile addition polymer comprising 1.0 mole percent acrylic acid functionality was achieved by charging a 5 L, 3-neck round bottomed flask equipped with a stirrer and thermometer with 800 mL (6.98 mol) styrene, 300 mL (4.56 mol) acrylonitrile, 8.29 g (115 mmol, 1 mole percent) acrylic acid, 3,83 g (23.3 mmol) AIBN and 1.5 L methyl ethyl ketone to produce a mixture. The mixture was then purged with nitrogen for 5 minutes and then stirred at 70° C. for 24 hours. The resulting viscous solution was cooled to room temperature and precipitated into methanol using a commercial blender. Polymer was isolated by filtration, washed with methanol and dried in a vacuum oven at 60° C. for 48 hours to afford 731 (73% isolated yield) of white powder, SAN-A. FTIR spectroscopy confirmed the incorporation of the acid monomer by the presence of the carbonyl absorbtion at 1730 cm$^{-1}$. Qualitative analysis of the FTIR spectra revealed an acrylonitrile concentration of 27 weight percent.

EXAMPLE 5

SAN comprising 1 mole percent acrylic acid as prepared in Example 4 was tumble mixed with orthoester functionalized EPDM and extruded in a twin screw extruder at 450° F. to produce an extrudate (EPDM, SAN and copolymer). The extrudate was cooled in a water bath, pelletized and dried for 4 hours at 80° C. Copolymer analysis was obtained from acetone extractions which dissolve away any unreacted SAN and leave behind unreacted EPDM and EPDM-SAN copolymer as insolubles. The analysis revealed high degrees of grafting and thus copolymer formation.

It is expected that isolated copolymers prepared by extrusion or solution polymerization may be tumble mixed with additional unfunctionalized or functionalized SAN and EPDM and extruded under conditions similar to those described above in order to produce AES blends.

It is noted that the instant blends may be prepared in situ in an extruder. Also, in the alternative, substantially pure copolymers may be prepared and isolated. Subsequent blends may be prepared by mixing the isolated copolymers with additional resins followed by extruding in a manner similar to the one described in Example 5.

The copolymers in Table 1 which follows have been prepared in the manner described in Example 5. The radical initiator employed in all samples was dicumyl peroxide except in Sample 3 wherein 2,5-dimethyl-2,5-di(t-butylperoxy) hexane was used. The data confirms copolymer formation.

TABLE 1

| Sample | EPDM (wt %)[a] + SAN (wt %)[b] | Copolymer Linkage | wt % insolubles[f] |
|---|---|---|---|
| 1 (control) | EPDM-1%-OE(50%) + SAN(50%) | None | 53.0 |
| 2 | EPDM-1%-OE (50%) + SAN-1%-A (50%)[c] | Ester | 54.8 |
| 3 | EPDM-1%-OE (50%) + SAN-1%-A (50%)[c] | Ester | 56.3 |
| 4 | EPDM-2%-OE (50%) + SAN-1%-A (50%)[c] | Ester | 54.2 |
| 5 | EPDM-2%-OE (50%) + SAN-1%-A (50%)[d] | Ester | 56.1 |
| 6 | EPDM-2%-OE (50%) + SAN-1%-A (50%)[d,e] | Ester | 66.6 |

[a]EPDM-1%-OE and EPDM-2%-OE are EPDM functionalized with 1 mole % and 2 mole % cyclic orthoester, respectively
[b]SAN-1%-A is SAN functionalized with 1 mole % of acrylic acid
[c]SAN-1%-A in powder form
[d]SAN-1%-A in pellet form
[e]EPDM-2%-OE (80%) + SAN-1%-A (20%) copolymer was preextruded and dried to produce an 80/20 copolymer. 62.5% of the 80/20 copolymer was blended with 37.5% SAN-1%-A to produce Sample 6.
[f]Copolymer analysis obtained from acetone extractions confirmed by measuring the amount of insoluble EPDM-SAN copolymer and EPDM The blends in Table 2 have been prepared by mixing the copolymers in Table 1 with SAN resin. All blends were extruded on a twin screw extruder at 450° F. The extrudate was cooled in a water bath, pelletized and dried for 4 hours at 80° C. Percent maximum elongation and notched Izod values confirm the new and unexpected results in the instant invention.

TABLE 2

| Sample | EPDM-SAN copolymer[a] blend (50 wt %) extruded with SAN (50 wt %) | 50 wt % polymer in blend | Notched Izod joules/M | Maximum elongation % |
|---|---|---|---|---|
| 1 (control) | coploymer 1 | SAN | 32.0 | 6.3 |
| 2 | copolymer 2 | SAN | 144.0 | 16.6 |
| 3 | copolymer 3 | SAN | 202.9 | 12.6 |
| 4 | copolymer 4 | SAN | 272.3 | 16.0 |
| 5 | copolymer 5 | SAN | 90.8 | 9.4 |
| 6 | copolymer 6 | SAN | 336.4 | 25.6 |

[a]Copolymer corresponds to those described in Table 1.

From Table 2, it is evident that the thermoplastic olefin copolymers of the instant invention unexpectedly improve notched Izod values as well as tensile elongation values.

What is claimed is:

1. A blend comprising a thermoplastic olefin copolymer and a polymer suitable for generating the blend wherein the copolymer is prepared by reacting an orthoester or orthocarbonate functionalized olefin polymer with an additional polymer wherein:
   (a) the orthoester or orthocarbonate functionalized olefin polymer comprises structural units of the formula

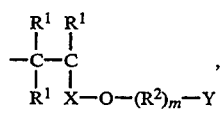

wherein each $R^1$ is independently a hydrogen, $C_1$–$C_5$ hydrocarbon, substituted or unsubstituted aromatic radical or a halogen and $R^2$ is —$CH_2$— or a substituted or unsubstituted divalent aromatic radical and m is any integer greater than or equal to 1 and X has the formulae

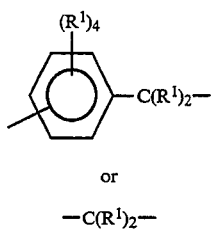

or

—$C(R^1)_2$—

Y is selected from the group consisting of moieties of cyclic orthocarbonates, and cyclic orthoesters; and
   (b) the additional polymer has acid, acid anhydride or thiol functionality.

2. A blend in accordance with claim 1 wherein said polymer suitable for generating the blend is a polyphenylene ether, polyphenylene sulfide, polystyrene or acrylic.

3. A blend in accordance with claim 1 wherein said cyclic orthocarbonate and cyclic orthoester moieties have the formula

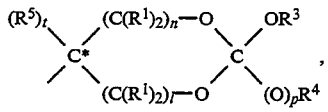

wherein $R^3$ is a $C_1$–$C_{10}$ primary or secondary alkyl or aralkyl or a $C_6$–$C_{10}$ aromatic radical or an alkene radical forming a second 4 to 8 membered ring with $C^*$ to produce a bicyclo compound and $R^4$ is a $C_1$–$C_{10}$ primary or secondary alkyl or aralkyl or a $C_6$–$C_{10}$ aromatic radical and $R^3$ and $R^4$ together with atoms connecting them can form a 4 to 8 membered ring to produce a spirobicyclo compound and $R^5$ is a hydrogen, alkyl or aryl and l is 0 or 1 and n is an integer from 0 to 2 and p is 0 or 1 and t is 0 when $R^3$ and $C^*$ form a bicyclo compound and is otherwise 1.

4. A blend in accordance with claim 1 wherein said additional polymer is a functionalized polyphenylene ether, polyphenylene sulfide, polystyrene or acrylic.

5. A blend in accordance with claim 1 wherein said blend is prepared in the melt or solution.

6. A blend in accordance with claim 1 wherein said thermoplastic olefin copolymer is an EPDM-SAN copolymer.

* * * * *